Feb. 6, 1968     T. L. CARTER III     3,367,534
PLASTIC BOTTLE FEEDER HAVING ORIENTING MEANS
Filed July 26, 1965     4 Sheets-Sheet 1
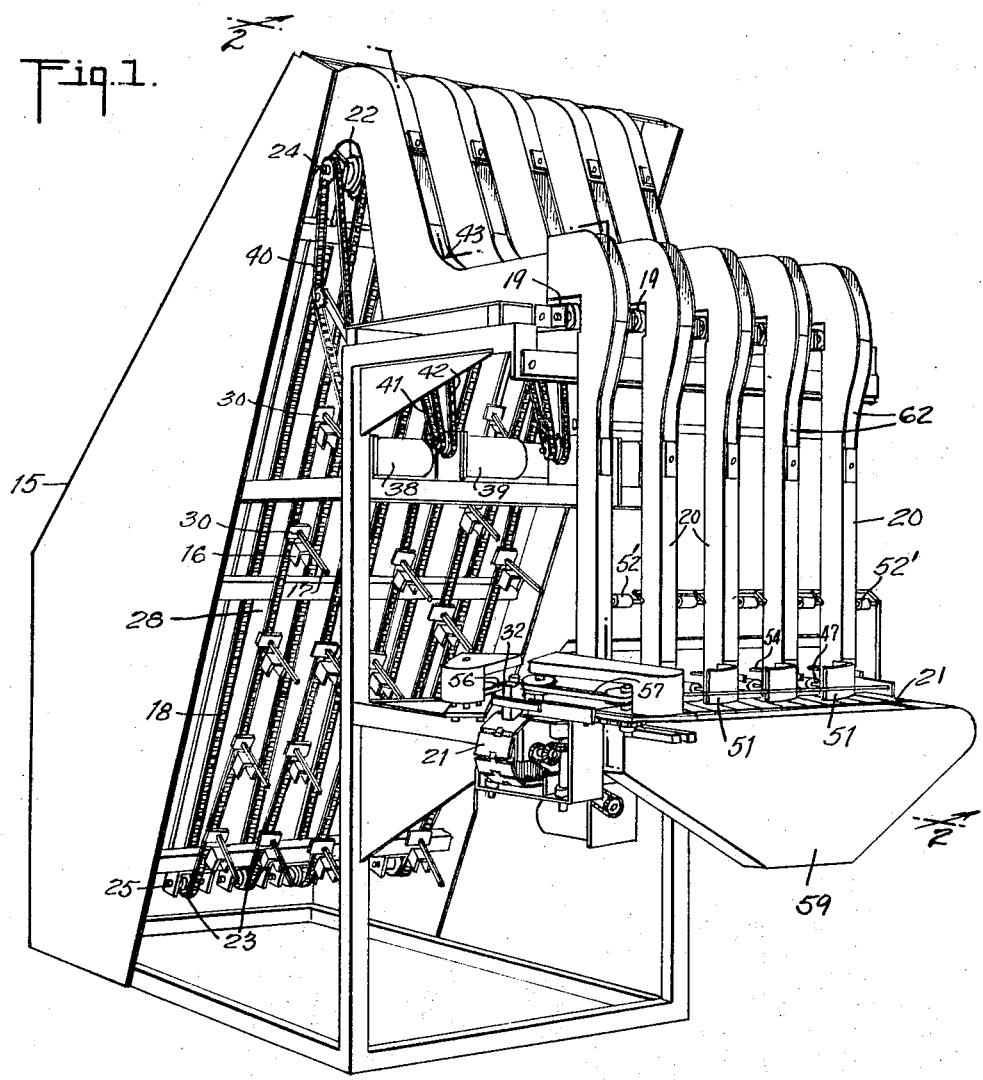
INVENTOR.
TERRY L. CARTER, III
BY
ATTORNEY

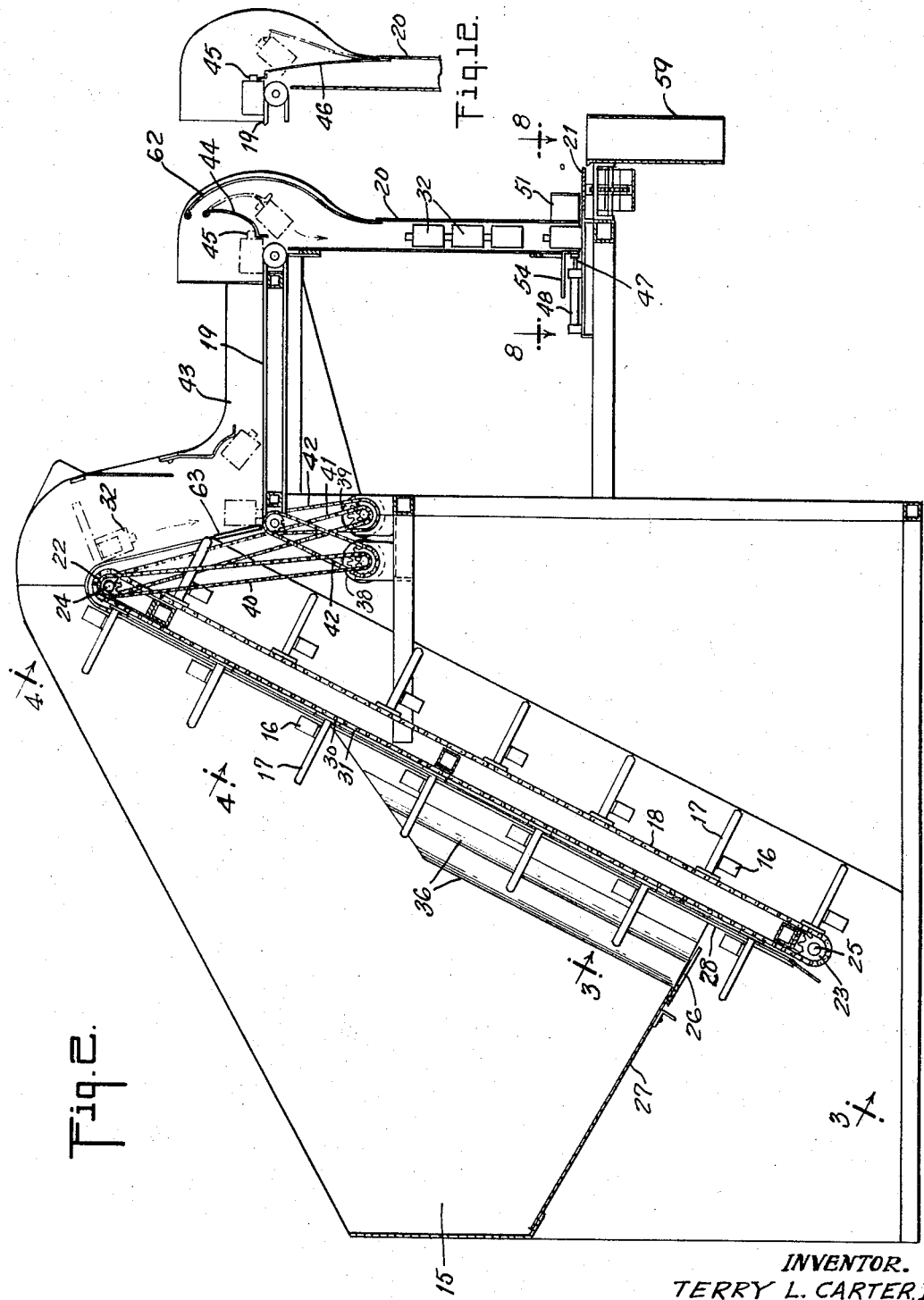

Feb. 6, 1968 T. L. CARTER III 3,367,534
PLASTIC BOTTLE FEEDER HAVING ORIENTING MEANS
Filed July 26, 1965 4 Sheets-Sheet 3
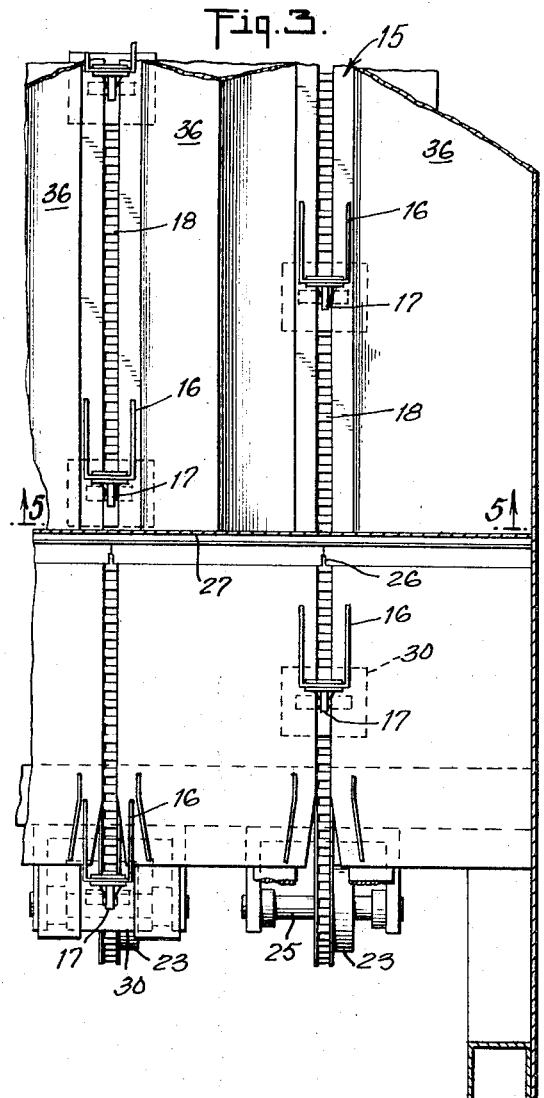
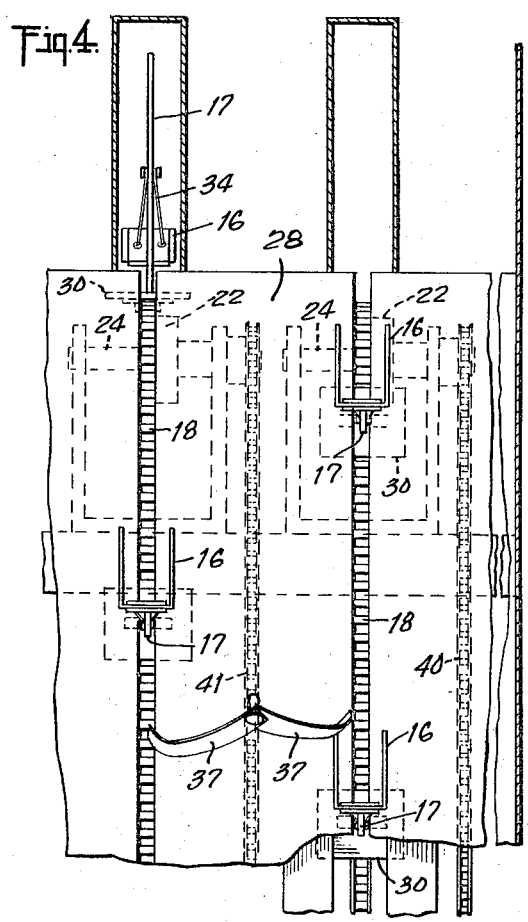
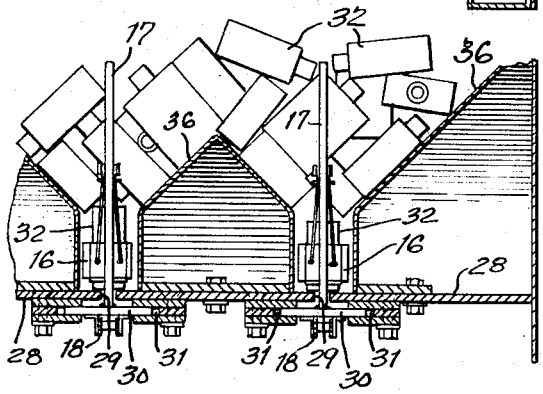
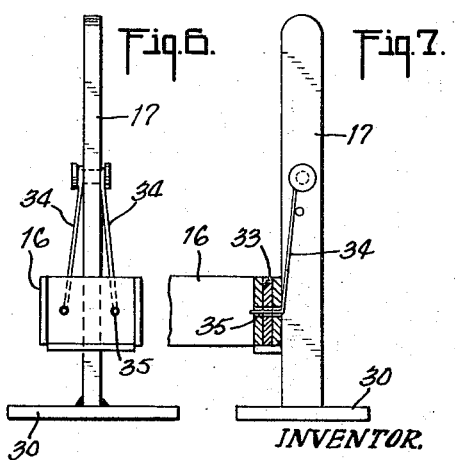
INVENTOR.
TERRY L. CARTER, III
BY
*Philip S. Hican*
ATTORNEY Feb. 6, 1968     T. L. CARTER III     3,367,534
PLASTIC BOTTLE FEEDER HAVING ORIENTING MEANS
Filed July 26, 1965     4 Sheets-Sheet 4
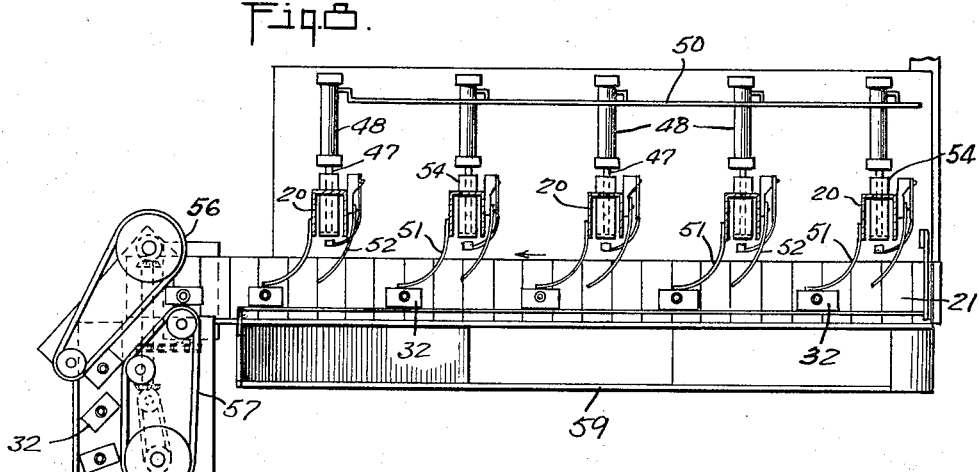
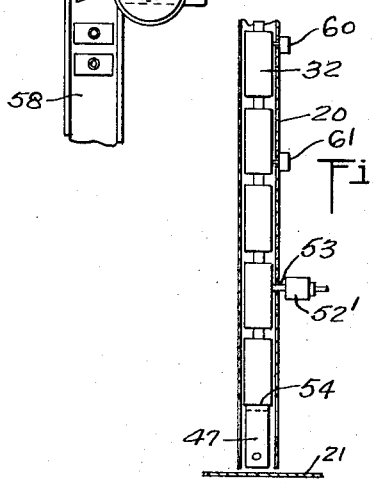
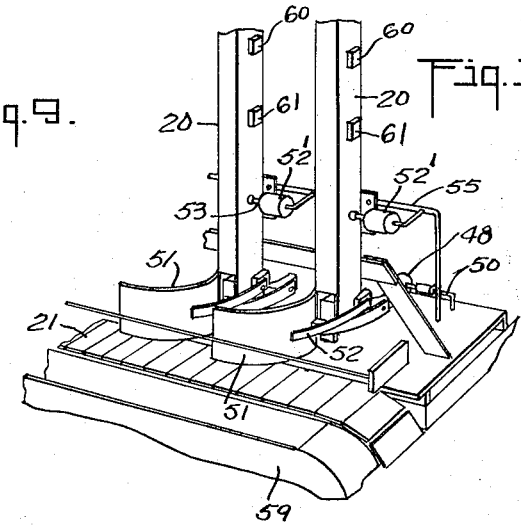
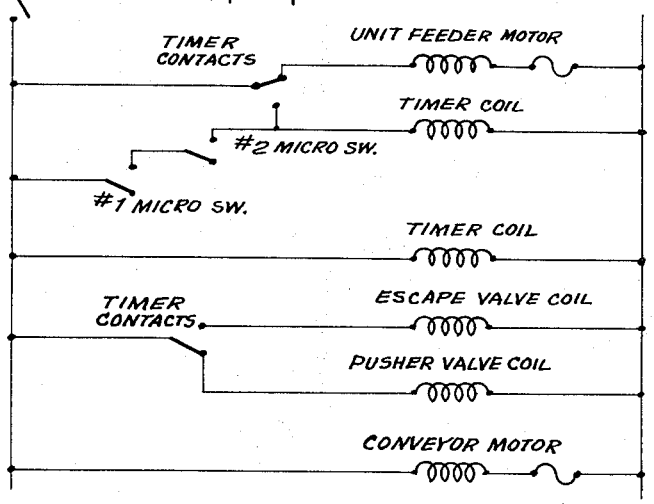
INVENTOR
TERRY L. CARTER, III
BY
ATTORNEY United States Patent Office 3,367,534
Patented Feb. 6, 1968

3,367,534
PLASTIC BOTTLE FEEDER HAVING
ORIENTING MEANS
Terry L. Carter III, Box 75, Glen Road,
Sparta, N.J. 07871
Filed July 26, 1965, Ser. No. 474,897
7 Claims. (Cl. 221—68)

The invention herein disclosed relates particularly, though not exclusively, to the feeding of empty plastic bottles from bulk, in proper alignment to machines or equipment for acting on such objects.

The primary purpose of the invention is to provide simple, practical and efficient mechanism for first picking up single articles out of a bulk supply, transferring the individualized items in properly directed position to a stacking magazine and then separating the bottom of the stacked articles and advancing them into row forming relation on a delivery conveyor carrying a row of such articles to a receiver for the articles, with means at the last stage of operation for detecting and throwing out misplaced or other forms of "rejects."

Particularly it is a purpose of the invention to provide such mechanism in a compact well designed machine, occupying reasonably small floor space and adapted to be produced at low cost.

Further special objects of the invention are to provide such a machine which will not require special servicing attention, can be readily changed to handle different sizes and kinds of objects and which can be made up in a multiple unit form and when so produced can be so controlled that with any fault developing in one unit, that one unit may be shut down without affecting operation of the balance of the units in the machine.

The latter feature is particularly important since one or more of such units in a multiple unit machine may be operated at will and the output of the machine thus readily controlled.

When there is a variable supply of containers, control switches at use point may be used to start and stop one or more of such independent units as requirements dictate.

The foregoing and other desirable objects have been accomplished by the above indicated and other novel features of construction, combinations and relations of parts; as set forth in the following specification and covered in the claims.

The drawings accompanying and forming part of the specification are illustrative of a presently preferred embodiment of the invention. Structure, however, may be modified and changed as regards the immediate illustration; all within the true intent and scope of the invention, as hereinafter defined and claimed.

FIG. 1 in the drawings is a front perspective view of one of the machines, made up of five independent and separately driven units.

FIG. 2 is a broken vertical sectional view of the machine taken on substantially the plane of line 2—2 of FIG. 1.

FIG. 3 is a broken vertical sectional view, on a slightly larger scale, of the lower portion of the machine on substantially the plane of line 3—3 of FIG. 2.

FIG. 4 is a similar view of the upper portion of the machine on substantially the plane of line 4—4 of FIG. 2.

FIG. 5 is a broken cross sectional detail on substantially the plane of line 5—5 of FIG. 3.

FIGS. 6 and 7 are front and side views on a larger scale, of one of the article holding fingers of the lift conveyors.

FIG. 8 is a broken section and part plan view on substantially the plane of line 8—8 of FIG. 2, illustrating delivery of the articles from the magazines onto the conveyor for lining them up into a single row.

FIG. 9 is a broken part sectional detail of escape mechanism controlling delivery of articles from the magazines onto the lining up conveyor.

FIG. 10 is a broken perspective view illustrating the guides for directing articles discharging from the magazines into line on the delivery conveyor.

FIG. 11 is a simplified basic wiring diagram.

FIG. 12 is a broken part sectional detail view illustrating a modified form of position correcting trip for the containers.

In the general view, FIG. 1, there is shown a hopper 15 for holding a supply of loose articles such as empty plastic bottles, with holders 16 for such articles carried by posts or fingers 17, on chains 18, operating up through the bottom of the hopper and discharging such articles at the top onto horizontal conveyors 19, carrying such articles to vertical magazines 20, which deliver the bottom articles in the magazines onto a conveyor 21 travelling past the foot of such magazines.

FIG. 2 shows the chains 18 trained over sprockets 22 and 23 on upper and lower shafts 24 and 25 and the holders on these chains as passing up through slots 26 in the bottom 27 of the hopper.

The upwardly inclined back wall 28, FIG. 2, of the hopper is made up with slots 29, FIG. 5, to pass the upstanding fingers on the upper runs of the chains.

The latter view also shows how the pickup fingers are mounted on flat baseplates 30, attached to the chains and riding in opposed guide slots 31, provided on the back wall at opposite sides of the finger receiving slots or passages 29.

The article holders 16, in the present disclosure, are of U-shape formation to loosely receive only one of the empty containers 32, which in this case are of somewhat flattened shape.

Holders for articles of different sizes and shape are provided and these are interchangeably mounted on the pickup fingers 17.

FIGS. 6 and 7 show how this is accomplished by providing sockets 33 on the forwardly facing sides of the pickup fingers, positioned to receive the back or loop portions of the U-shaped holders 16.

These holders are releasably locked in place on the carrying fingers by springs 34, projecting through openings 35, FIG. 7, in the front and back walls of the sockets and through corresponding openings in the back walls of the U-shaped holders.

To make a change from one form of holder to another, it is then only necessary to press back the springs 34 sufficiently to release the holder and to replace that holder by a correspondingly perforated holder.

The loose articles 32 in the supply bin are guided into the path of the up travelling pickup fingers by inclined partitions 36, detachably mounted on the back wall 28 between the finger slots substantially as shown in FIGS. 3 and 5.

These inclined partitions extend only part way up the back wall, as indicated in FIG. 2, leaving free space above the same for the extra containers to fall away back into the bottom of the hopper.

Wipers 37, FIG. 4, may be mounted on these inclined guide partitions or on the back wall above the partitions to prevent accumulation of more than one article per finger.

The pickup conveyors are separately driven, independently of each other so that if a shutdown of one is necessary, that will not affect the operation of other conveyors.

In FIG. 2, two of the driving motors for the uplift conveyors are shown at 38, 39, connected by drive chains 40, 41, with the upper shafts 24 of the conveyors and this view also shows the lateral takeoff conveyors 19 as driven by chains 42 from the same motors, each to form a unit with the associated pickup conveyor.

The articles 32 lifted by the pickup conveyors and dropped into the transverse conveyors 19, are channelled between guide walls 43, FIG. 2, to a position where they will drop into the upright magazines 20, and in such travel are controlled so as to enter the magazines in an upright position.

In FIG. 2, this upending of the items is accomplished by a yielding hook 44, of plastic or the like, positioned in the throat of the magazine to engage an extended mouthpiece 45 on one end of the article and thus trip the article into a bottom downward position.

As a modification, this result may be accomplished as shown in FIG. 12 by a yielding trip finger 46 below and positioned to catch an extended mouthpiece and thus trip the container into upright position.

For containers that have no extended mouthpiece or neck and simply have an opening in one end and no opening in the other end, the trip finger is disposed to catch into the open end and not to catch the closed end of the container.

In all forms the trip finger is flexible so as simply to yield with pressure of a container in proper position on belt 19.

When containers contact the trip finger closed end first, the trip finger simply yields, permitting the container to slide off and drop closed end downward, off the end of conveyor 19.

When containers contact the trip finger open end or neck first, the trip finger holds up the open end until the closed end has passed off the belt, thus "upending" the container and causing it to fall "neck up" or open end up into the magazine 20.

FIGS. 2 and 8 show how the containers are ejected from the bottom of the magazine by pushers 47, operated by air cylinders 48, at the back of the magazines and arranged to discharge the bottom containers onto the take off conveyor 21, travelling past the foot of the magazine.

These air cylinders are connected together at 50, as shown in FIG. 8, so as to operate in unison and thus to place the articles in properly spaced alignment on the delivery conveyor.

FIGS. 8 and 10 show curved guides 51 extended out from the bottom of the magazines, over the delivery conveyor and curved spring fingers 52, substantially parallel with the guides to turn the ejected containers into edge-to-edge aligned position on the conveyor.

When the bottom article is ejected from a magazine, the articles above the one being ejected are temporarily supported by a gripper 52', FIGS. 9 and 10, in the form of an air cylinder operating a plunger 53 through the side of the magazine into engagement with the second article above the bottom unit, the next to the bottom unit being supported at such time by a cutoff slide 54, carried by the pusher.

The article supporting grippers 52', like the pushers, are all actuated in unison through air connections indicated at 55, FIG. 10.

Thus the escapement formed by reversely operating pushers 47, 48 and grippers 52', 53, permits one container only to drop into place in front of the pushers, holding upper containers in the magazine so that no pressure is applied to the container that is being discharged from the magazine.

The aligned articles taken off by the delivery conveyor 21 are given a final test for proper position by passing between convergent conveyor belts 56, 57, FIG. 8, located at a proper height to engage the articles if they are standing up and to miss the articles entirely if they reach these belts in a lying down position.

Thus only bottles that are standing upright are delivered to intended destination.

After this final test, the articles may go to the customer's conveyor 58, FIG. 8, or to such other destination or receiver as required.

Names of the different parts have been applied to the wiring diagram, FIG. 11, to indicate the connection, relation and operation of the parts described.

The misplaced, rejected articles may drop from between the narrow transfer belts 56, 57, into a receiving hopper 59, for later inspection and use.

Each magazine is shown equipped with article engaging contact switches 60, 61, FIG. 9, spaced a vertical distance greater than the height of one of the articles and connected to stop the motor driving that unit when both switches are engaged by articles at the same time.

The conveyors supplying the magazines are preferably timed to feed the articles somewhat faster than the reciprocating pushers can take them away.

When the two top articles in a magazine engage both feeler switches 60, 61, they operate through a time delay circuit to stop the motor on that particular feeder unit, enabling that feeder to stop and wait until the pusher catches up with the action by removing one or more articles from the bottom to lower the stack away from the switches and which then again close the motor circuit to start feeding articles to the magazine.

Each feed unit consisting of bucket conveyor, lateral lead off conveyor and associated vertical magazine, is driven by its own motor so that if a fault develops at any such unit, that unit may be taken out of service by simply cutting the motor circuit of that unit.

The machine will continue in operation, on the units remaining in operation. Thus the inaction of one feed unit does not impair operation of the machine, except as to the loss of production to that extent. When one feed unit is taken out of action, the pusher for the magazine of that particular unit will simply operate idly, ready to resume action when that particular unit is again rendered operative.

The inclined guides between the uplifting conveyors are readily removable so that guides of different shapes and sizes may be quickly interchanged to suit the handling of different objects.

The cups or holders for the articles can be quickly interchanged to suit different sizes and shapes so that the machine is of substantially universal adaptability.

The guides 43 and magazines 20 are readily interchangeable for various sizes and container shapes.

Light weight, flexible plastic "curtain" strips 62, FIGS. 1 and 2, guide the dropping containers into the magazines. These guide strips are loosely positioned into the top of the magazines so that if the magazines overfeed for any reason, the pressure of too many bottles will cause the guide strips to release the excess, without harm to the feeders. Simply replacing the guide strips manually restores such a unit to operating condition after the fault has been corrected.

Similar guide strips 63, performing the same protective function are shown in FIG. 2 at the entrance end of the conveyor 19.

These displaceable and replaceable stock guiding curtains are important safety features; protecting the feeders from injury.

The ready interchangeability of parts is a further important feature.

The automatic stopping and starting of different feed units, to meet different feed situations is important as protecting the parts and for maintaining the machine in proper operating condition.

What is claimed is:

1. A machine for feeding empty plastic bottles of the type having closed butt ends and projecting necks or openings at the opposite ends, comprising
   a hopper for holding a loose bulk of the bottles,
   a bucket conveyor having single article holding pockets operating up through said hopper, a transfer conveyor positioned to receive bottles from the upper end of said bucket conveyor, a stacking magazine having its upper end positioned to take bottles advanced by said transfer conveyor, bottle orienting means over said transfer conveyor and stacking magazine for passing bottles feeding butt end first and for engaging the neck portions of reversely feeding bottles for reversing the latter bottles end for end, a delivery conveyor travelling past the lower end of said stacking magazine and a pusher for separating the lowermost bottle and for discharging the same the right end up assured by said bottle orienting means, from the bottom of the stack on to said delivery conveyor and means trimmed in accord with said pusher for momentarily supporting bottles in the striking magazine above the lowermost bottle when the lowermost bottle is advanced by said pusher to said delivery conveyor.

2. The invention according to claim 1 with a guide at the opposite side of the stacking magazine from said pusher and curved in the direction of travel of bottles on said delivery conveyor to direct discharged bottles in aligned position on said delivery conveyor.

3. The invention according to claim 1 with a plurality of said bucket conveyors, transfer conveyors and stacking magazines arranged in side by side relation and positioned to deliver the articles simultaneously from said magazines into alignment on said delivery conveyor and means for actuating the same as units independent of each other and whereby one or more of such units may be shut down without affecting operation of the other, remaining unit or units.

4. In a machine for feeding articles from loose bulk into orderly alignment, the combination of a supply hopper having an upwardly inclined back wall, said wall having spaced parallel slots formed with opposed grooved guideways, plates slidingly engaged in said guideways, projecting article engaging pickup fingers on said plates extending up through said slots and provided each with means for holding only a single one of said articles, endless drive chains at the back of the wall connected with said sliding plates, and separately controlled independent motor drives for the respective drive chains.

5. The invention according to claim 4 in which said projecting fingers are provided with sockets and in which article engaging holders are removably supported in said sockets.

6. The invention according to claim 5 in which said sockets are in the form of offset clips on said projecting fingers and said holders are of U-shape formation removably engaged in said offset clips.

7. The invention according to claim 5 in which said sockets and holders have openings registering when holders are in place in said sockets, and in which spring projected elements on said fingers extend into said openings to releasably secure the holders in position on the pickup fingers.

References Cited

UNITED STATES PATENTS

| | | | |
|---|---|---|---|
| 836,129 | 11/1906 | McEvers | 221—253 |
| 972,649 | 10/1910 | Rose | 221—251 |
| 2,452,837 | 11/1948 | Colbert | 221—129 |
| 2,461,290 | 2/1949 | Maynard et al. | 198—33.1 |
| 2,587,740 | 3/1952 | Laughlin | 198—33 |
| 2,590,225 | 3/1952 | Bashore | 221—225 X |
| 2,627,380 | 2/1953 | Peterson | 221—10 X |
| 2,632,552 | 3/1953 | Coons | 198—33 |
| 2,649,214 | 8/1953 | Kirby et al. | 198—33 X |
| 2,682,983 | 7/1954 | Ashcroft | 221—93 X |
| 2,734,620 | 2/1956 | Fischer et al. | 221—175 X |
| 2,832,457 | 4/1958 | Randles | 221—10 X |
| 2,864,532 | 12/1958 | Gabrielsen | 221—253 X |
| 2,889,073 | 6/1959 | Nogle | 221—10 |
| 2,891,697 | 6/1959 | Beckers | 221—156 |
| 2,902,948 | 9/1959 | Fowler et al. | 221—253 |
| 2,937,738 | 5/1960 | Albertoli et al. | 198—33 |
| 3,032,211 | 5/1962 | Wordsworth | 221—176 X |
| 3,086,822 | 4/1963 | Fibish | 198—33.1 |

FOREIGN PATENTS 475,899   11/1937   Great Britain.

WALTER SOBIN, *Primary Examiner.*